United States Patent [19]
Yonehara

[11] Patent Number: 5,379,295
[45] Date of Patent: Jan. 3, 1995

[54] CROSS-CONNECT SYSTEM FOR ASYNCHRONOUS TRANSFER MODE

[75] Inventor: Akifumi Yonehara, Tokyo, Japan

[73] Assignee: NEC Corporation, Japan

[21] Appl. No.: 738,843

[22] Filed: Jul. 31, 1991

[30] Foreign Application Priority Data

Jul. 31, 1990 [JP] Japan .................................. 2-202699
Jul. 31, 1990 [JP] Japan .................................. 2-202700

[51] Int. Cl.$^6$ ............................................ H04L 12/56
[52] U.S. Cl. ....................................... 370/60; 370/94.1
[58] Field of Search ...................... 370/94.1, 60, 85.6, 370/85.5; 340/825.5, 825.51, 825.52

[56] References Cited

U.S. PATENT DOCUMENTS

| | | | |
|---|---|---|---|
| 4,866,701 | 9/1989 | Giacopelli et al. | 370/60 |
| 4,884,264 | 11/1989 | Servel et al. | 370/60 |
| 4,947,388 | 8/1990 | Kuwahara et al. | 370/94.1 |
| 5,062,106 | 10/1991 | Yamazaki et al. | 370/60 |
| 5,124,977 | 6/1992 | Kozaki et al. | 370/60 |
| 5,140,583 | 8/1992 | May et al. | 370/60 |
| 5,140,588 | 8/1992 | Danner | 370/60 |

OTHER PUBLICATIONS

"Output-buffer Switch Architecture for Asynchronous Transfer Mode", IEEE Communications Society, IEEE International Conference on Communications, Jun. 11–14, 1989, pp. 4.1.1 to 4.1.5 by Hiroshi Suzuki, Hiroshi Nagano, Toshio Suzuki, Takao Takeuchi and Susumu Iwasaki.

*Primary Examiner*—Douglas W. Olms
*Assistant Examiner*—Dang Ton
*Attorney, Agent, or Firm*—Ostrolenk, Faber, Gerb & Soffen

[57] ABSTRACT

A cross-connect communications system has an identifier separator for separating from a multi-bit header of an ATM cell a first multi-bit identifier to identify a destination of the ATM cell. The separator also separates a single bit broadcast identifier in the header which has first and second bit states and data in an information region of the ATM cell and associated with header information other than the first identifier and the broadcast identifier. A first memory stores a second identifier for obtaining the number of communications nodes to be broadcast and a new destination to which the broadcast is to be made in a position based on the first identifier when the broadcast identifier is in the first state. The first memory also stores a third identifier in a position based on the first identifier when the broadcast identifier is in the second state. An output circuit produces a count value corresponding to the number of nodes stored in the first memory. A second memory stores a fourth identifier corresponding to the destination of the broadcast to be made in a position based on the second identifier and the count value from the output circuit. A first cell assembling circuit assembles a cell to be broadcast from data derived from the information region and the fourth identifier. A second cell assembling circuit assembles a cell not to be broadcast from data derived from the information region and the third identifier. A selector outputs the cell to be broadcast and the cell not to be broadcast through a self-routing switch.

10 Claims, 8 Drawing Sheets

FIG. 6

Table 14:

| ADDRESS | DATA | |
|---|---|---|
| IN VPI | CNT | OUT VPI |
| 001 | 3 | 203 |
| 001 | 2 | 204 |
| 001 | 1 | 205 |
| 001 | 0 | 206 |

FIG. 5

Table 12:

| ADDRESS | DATA | | |
|---|---|---|---|
| IN VPI | BS1 | OUT VPI | NOD |
| 102 | "0" | 001 | 3 |
| 103 | "1" | 213 | 0 |
| 105 | "1" | 215 | 0 |

FIG. 12

Table 32:

| ADDRESS | DATA | | | |
|---|---|---|---|---|
| IN VPI | BS1/S1 | CLP | OUT VPI | NOD |
| 102 | "0" | "1" | 001 | 3 |
| 103 | "1" | "1" | 213 | 0 |
| 105 | "1" | "1" | 215 | 0 |
| ↑BS1 ↓S1 | | | | |
| 301 | "0" | "0" | 201 | 0 |
| 301 | "1" | "1" | 201 | 0 |
| 401 | "0" | "0" | 201 | 0 |
| 401 | "1" | "1" | 201 | 0 |
| 501 | "0" | "0" | 201 | 0 |
| 501 | "1" | "0" | 201 | 0 |
| 601 | "0" | "1" | 201 | 0 |
| 601 | "1" | "0" | 201 | 0 |

FIG. 10

Table 22:

| ADDRESS | DATA | |
|---|---|---|
| IN VPI | S1 | OUT VP |
| 301 | "0" | 201 |
| 301 | "1" | ALL"1" |
| 401 | "0" | 201 |
| 401 | "1" | ALL"1" |
| 501 | "0" | 201 |
| 501 | "1" | ALL"1" |
| 601 | "0" | 201 |
| 601 | "1" | ALL"1" |

CROSS-CONNECT SYSTEM FOR ASYNCHRONOUS TRANSFER MODE

BACKGROUND OF THE INVENTION

The present invention relates to a cross-connect system for asynchronous transfer mode (ATM) communication and, particularly, to a cross-connect system having a broadcast function.

In order to transmit or transfer voice, data and video information through a communication network, a channel mode of operation and a packet mode of operation are usually employed. In the channel mode operation, time-division multiplexing is employed by periodically arranging time slots so that a call occupies a channel of a constant rate regardless of existence of information. Therefore, the transfer rate is fixed by a particular network facility and degradation of usage efficiency of network resources is unavoidable. These problems are important when transfer rate required is unknown as in case of high rate, wide band communication network, particularly, a wide band ISDN (Integrated Services Digital Network). Therefore, a transfer mode which is not affected by transfer rate is required. On the other hand, in the packet mode, a packet multiplexer using header information is employed in which a packet is transferred upon occurrence of information. Therefore, it is possible to accommodate to any transfer rate. However, in the packet mode, complicated protocols are necessary and software processing for executing these protocols limits the improvement of transfer rate. This becomes a constraint when video information is to be transferred on a real time basis.

In order to solve the problems inherent to the channel mode and packet mode, ATM transmission has been proposed, recently, as the transfer mode and a reduction thereof toward realization is still being developed. The ATM transmission is a technique in which multi-media information is transferred and exchanged after being divided into blocks, referred to as cells, each having a small fixed length and including a header and an information region (header 5 bytes or 40 bits long and information region 48 bytes or 384 bits long in CCITT recommendation I.150 and I.361). ATM, which employs cell multiplexing using header information, can change transfer rate dynamically with a single high speed link of, for example, 156 M bps. Further in ATM transmission, by providing a self-routing switch for allocating a cell according to its header information, the processor does not have any direct contribution in a switch control processing. Therefore, the ATM can transfer multi-media information containing voice and video information which is to be transmitted in real time at a high rate.

When a high speed, wide band communication network is to be constructed using ATM capable of performing high rate transfer of multi-media information while efficiently using network resources, a broadcast function is required, particularly for the application of video information. Communication stations or nodes comprising this communication network are equipped with self-routing switches as cross-connect switches for routing cells to respective destination stations. Conventional self-routing switches proposed are of various types such as the BANYAN type and output buffer type (cf. H. Suzuki, et al., "Output-buffer Switch Architecture for Asynchronous Transfer Mode", IEEE ICC 89, pp. 99-103, June 1989). Therefore, a circuit providing a broadcast function which is adaptable to any type of self-routing switch provided in any node is required.

SUMMARY OF THE INVENTION

An object of the present invention is to provide cross-connect communication equipment having a broadcast function capable of being adaptable to any type of self-routing switch.

Another object of the present invention is to provide a cross-connect communication equipment having an effective cell selecting function for selecting and transferring an effective one of a plurality of cells.

A further object of the present invention is to provide cross-connect communication equipment having both a broadcast function and the effective cell selecting function.

The cross-connect communication system of the present invention comprises an identifier separator for separating from a multi-bit header of an ATM cell of a predetermined number of bits a first multi-bit identifier to identify a destination of the ATM cell. The separator also separates from the header a single bit broadcast identifier contained in the header and having a first bit state and a second bit state indicative of need and lack of need for broadcasting, and data in an information region of the ATM cell and associated with header information other than the first identifier and the broadcast identifier. A first memory temporarily stores a second identifier for obtaining the number of communication nodes to be broadcast and a new destination to which the broadcast is to be made in a position assigned on the basis of the first identifier when the broadcast identifier is in the first state. The first memory also stores a new third identifier in the position assigned on the basis of the first identifier when the broadcast identifier is in the second state. An output circuit produces a count value corresponding to the number of the nodes stored in the first memory. A second memory preliminarily and consecutively stores a fourth identifier corresponding to the destination of the broadcast to be performed in a position assigned on the basis of the second identifier from the first memory and the count value from the output circuit. A first cell assembling circuit assembles a cell to be broadcast from the data derived from the information region and the fourth identifier from the second memory. A second cell assembling circuit assembles a cell not to be broadcast from the data derived from the information area and the third identifier from the first memory. A selector selectively outputs the cell to be broadcast and the cell not to be broadcast from the first and second assembling circuits to a self-routing switch.

BRIEF DESCRIPTION OF THE DRAWINGS

The above and other objects and features of the present invention may be fully understood from the following detailed description and the accompanying drawings in which:

FIGS. 5 and 6 are illustrations explaining the first and second header conversion memories shown in FIG. 2;

FIG. 9 shows the relation between input/output cells of the cell selector circuit shown in FIG. 8;

FIG. 10 is an illustration explaining the header conversion memory circuit shown in FIG. 8;

FIG. 12 is an illustration explaining the first header conversion memory circuit shown in FIG. 11.

DETAILED DESCRIPTION OF THE PREFERRED EMBODIMENTS

Figure 1:
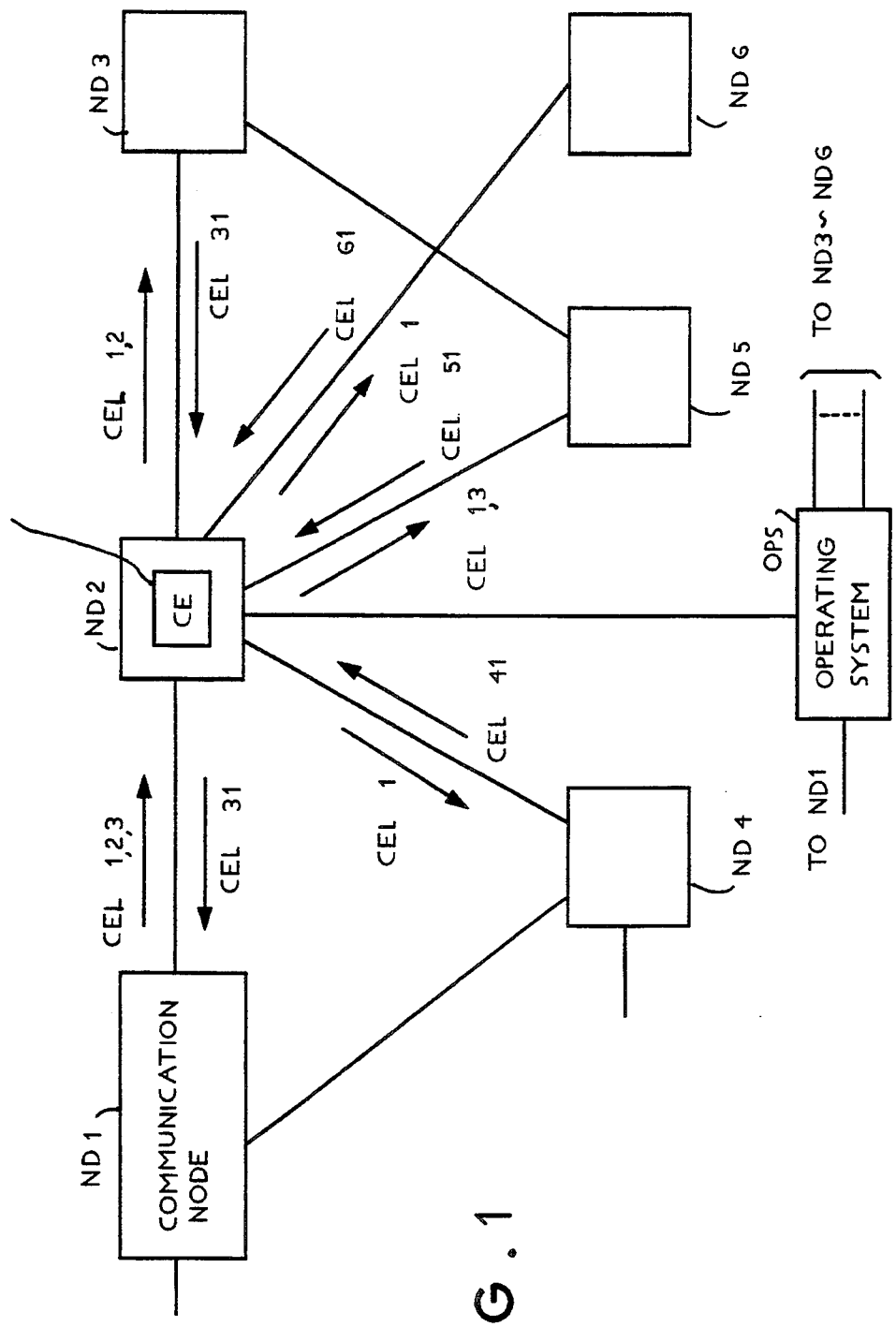
FIG. 1 shows a communication network according to a first embodiment of the present invention.
Figure 2:
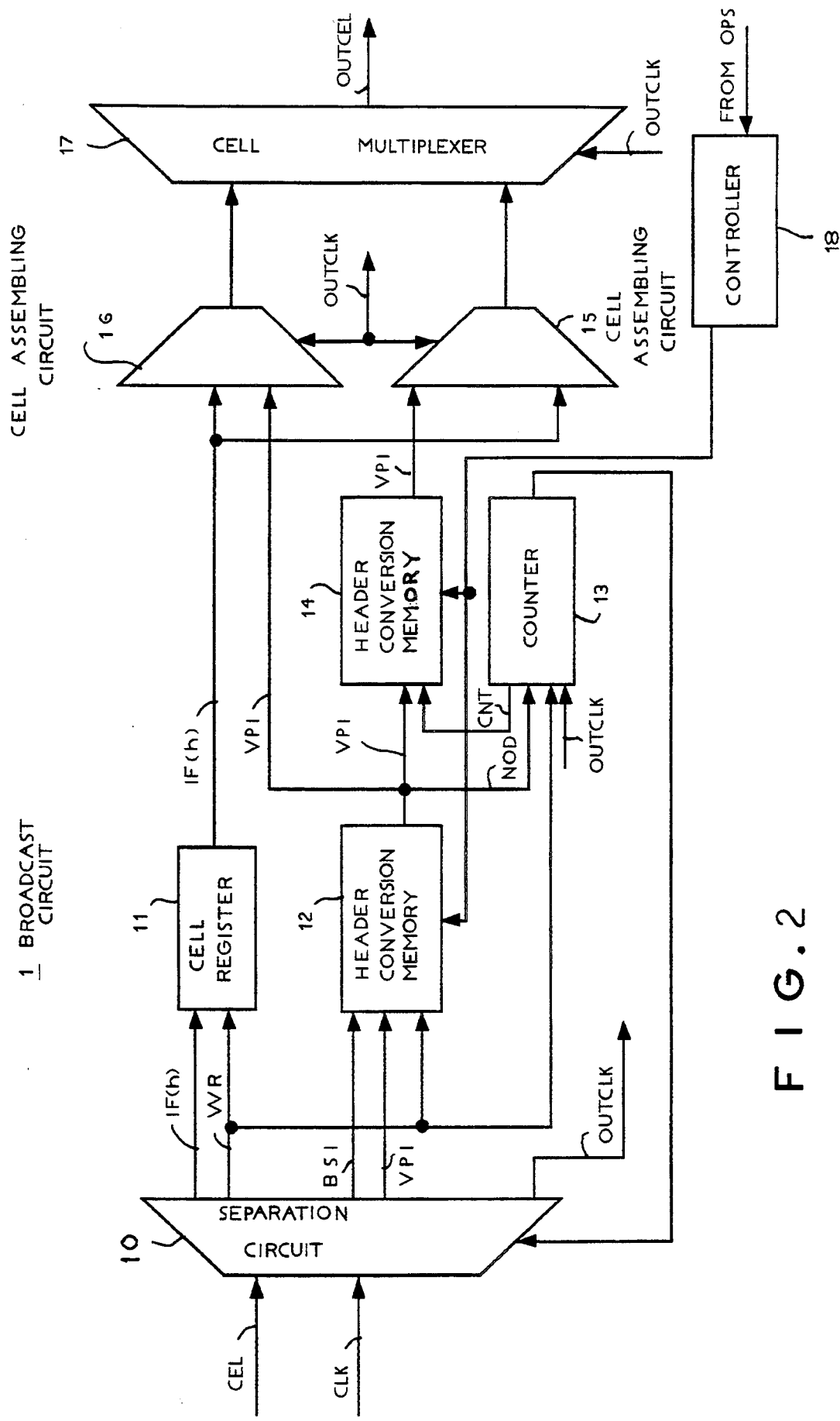
FIG. 2 shows a construction of a broadcast circuit of the first embodiment of the present invention.
Figure 8:
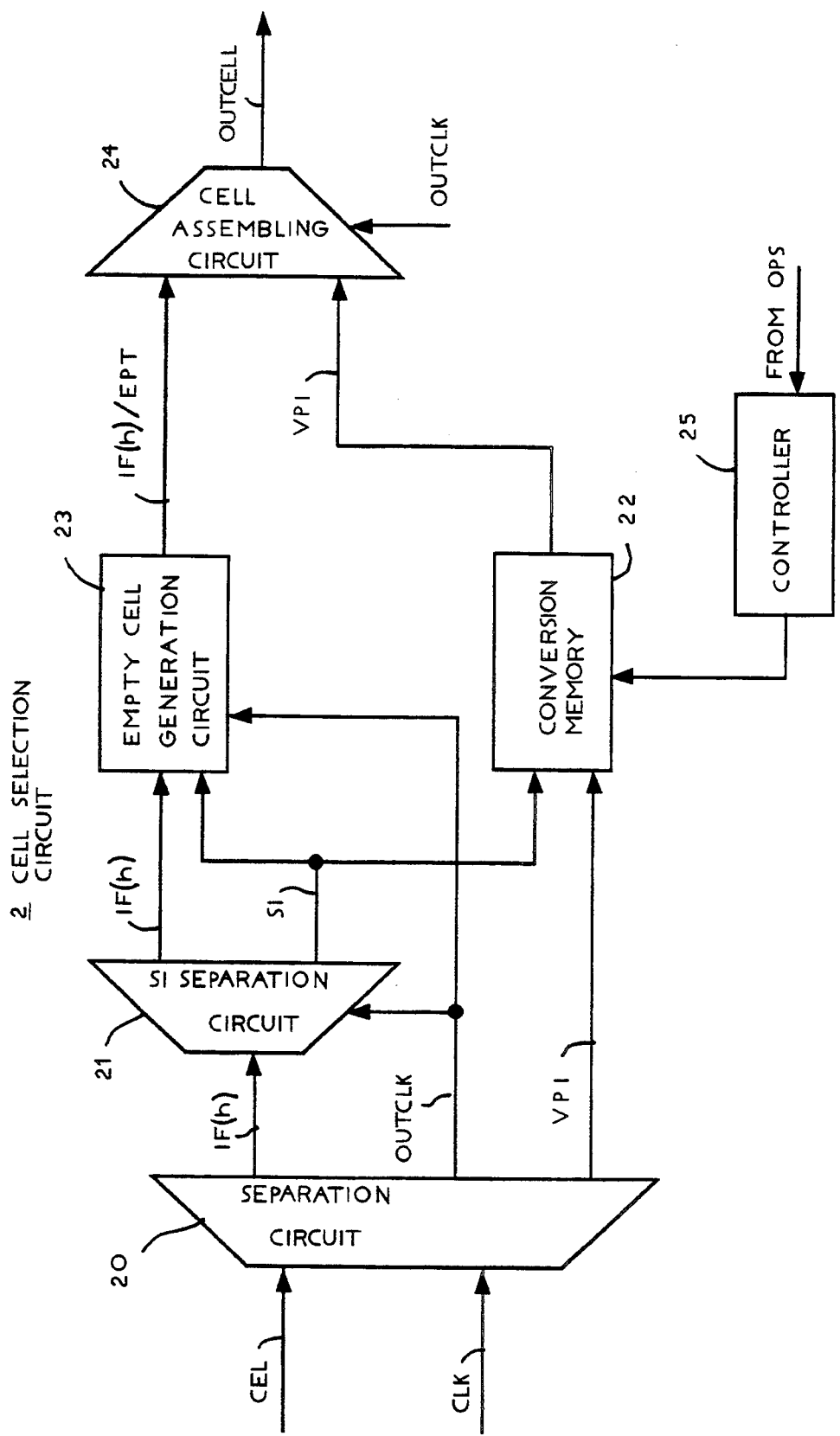
FIG. 8 shows a construction of a cell selector circuit in the first embodiment of the present invention.

Referring to FIGS. 1 and 2, a high speed, wide band communication network according to the first embodiment of the present invention includes a plurality of communication stations or communication nodes ND1, ND2, ND3, ND4, ND5 and ND6 which are totally managed by an operating system OPS. The nodes ND1, ..., ND6 are logically connected mutually through transmission path and include self-routing switches (also referred to as cross-connect switches) for connecting ATM cells within an input path to the output path autonomously. The node ND2 has an ATM cross-connect communication apparatus CE including a broadcast circuit 1 and a cell selector (depicted by 2 in FIG. 8), to be described later. This embodiment will be described for a case where an ATM cell CEL1 from the node ND1 which is the information source is divided into four nodes ND3, ND4, ND5 and ND6 under control of the broadcast circuit 1 provided in the node ND2, and a case where ATM cells CEL31, CEL41, CEL51 and CEL61 from the nodes ND3, ND4, ND5 and ND6 are collectively selected by the cell selector provided in the node ND2 and only effective nodes are transferred to the node ND2. In the broadcast circuit 1, a separator 10 separates a broadcast identifier BSI and a virtual path identifier VPI both contained in the header from the multiplexed input ATM cells CELs from each other. The broadcast identifier BSI is a bit for identifying a cell to be broadcast which can be allocated to a portion of any one of a virtual path identification area of the cell header, a virtual channel identification area and a payload type area. In this embodiment, a portion of the virtual path identification area is allocated to the broadcast identifier BSI to process the system in such a way that, when the identifier BSI is logical "0", the cell is broadcast and when it is logical "1" the cell is not broadcast.

Figure 3:
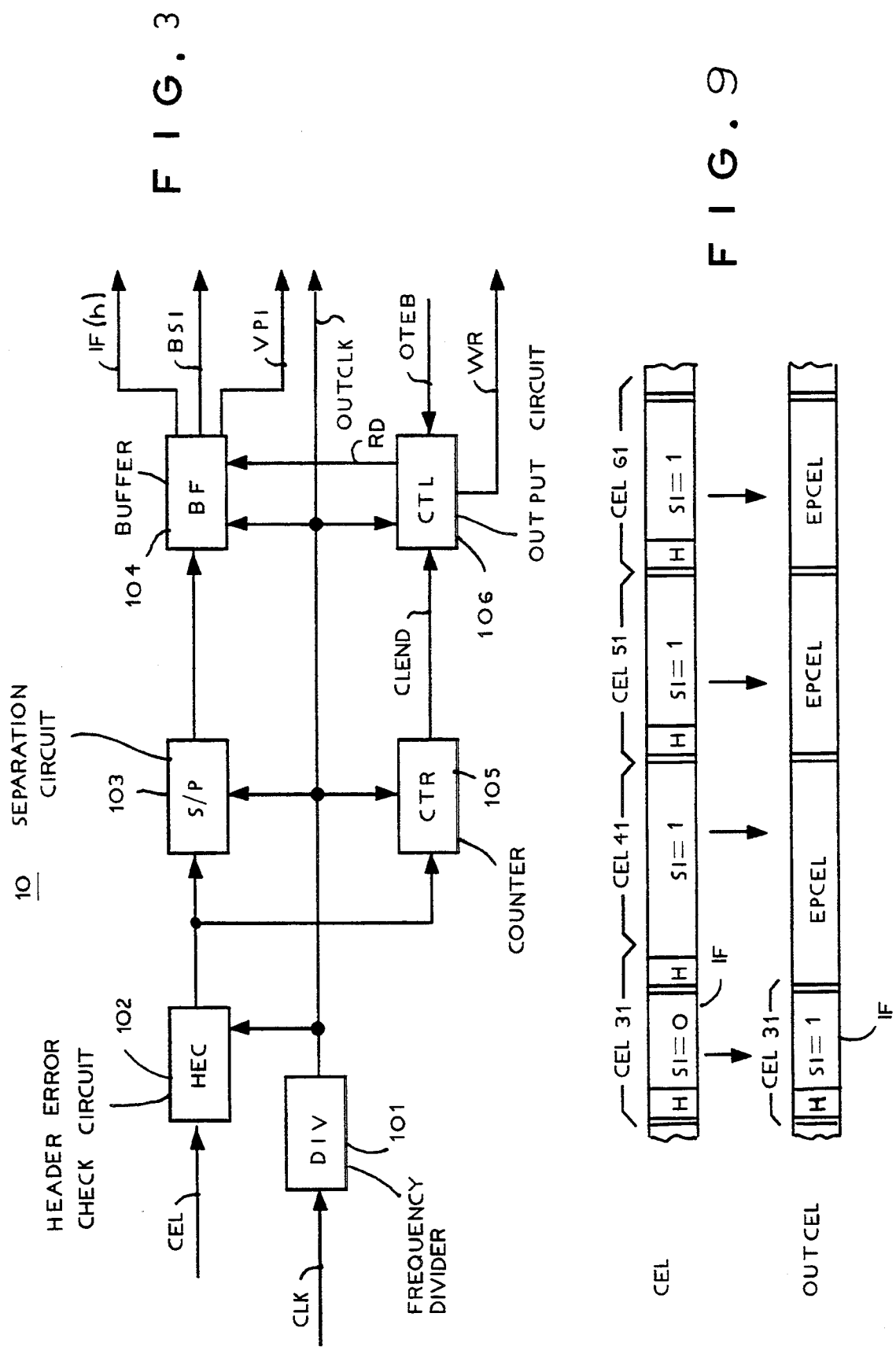
FIGS. 3 and 4 show a detailed construction of the separator circuit in FIG. 2 and input/output signals in the circuit, respectively.
Figure 4:
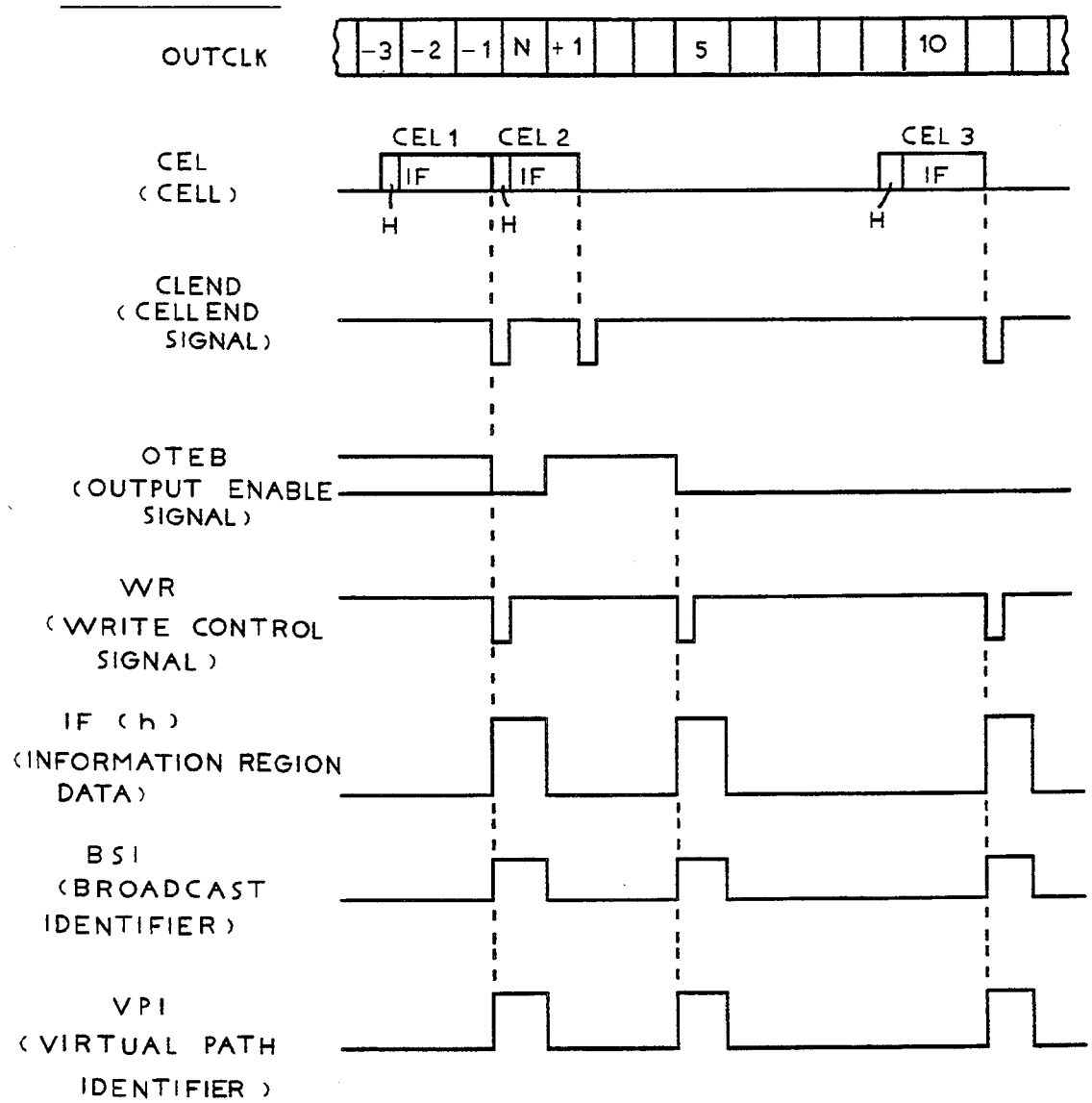

The separator 10 shown in FIG. 2 will be described in detail with reference to FIGS. 3 and 4. The separator 10 includes a frequency divider (DIV) 101 for dividing an internal basic clock CLK of the cross-connect system down to a predetermined frequency clock OUTCLK and operates according to the clock OUTCLK outputted from the divider 101. In detail, the divider 101 divides the basic clock CLK of 156 M bps by eight to produce the clock OUTCLK by which other circuits of the separator and the broadcast circuit 1 perform a parallel data processing on a byte unit basis. A header error check circuit (HEC) 102 detects the header H and checks on any error S in the header H by performing a CRC operation on the input header H of the ATM cell containing the header 5 bytes long and an information region IF 48 bytes long. As a result, only a cell CEL whose header does not contain any error is inputted from the check circuit 102 to a serial-parallel conversion circuit (S/P) 103. The conversion circuit 103 converts the headers H and the information areas IFs of the cells CELs serially inputted as serial data into parallel data and inputs them to a buffer (BF) 104 of FIFO (first in first out) type. A counter (CTR) 105, which is activated upon header detection of the check circuit 102 and performs a counting operation to detect an end of the cell CEL, outputs a cell end signal CLEND after counting 53 bytes. An output control circuit (CTL) 106 responds to the cell end signal CLEND from the counter 105 and an output enable signal OTEB from a counter which is depicted by 13 in FIG. 2 and to be described later and, when the signals CLEND and OTEB are both logical "0", outputs a write control signal WR and also an output control signal RD of accumulated data to be supplied to the buffer 104. The buffer 104 responds to the signal RD from the output control circuit 106 to output the accumulated broadcast identifier BSI, the virtual path identifier VPI and the data IF(h) of the information area as parallel data, respectively. When, as shown in FIG. 4, three ATM cells CEL1, CEL2 and CEL3 are inputted sequentially, the separator 10 performs the above-mentioned operation for each cell to separate the identifiers BSIs and VPIs and data IF(h)s from each other.

Returning to FIG. 2, the data IF(h) of the information area associated with other header information separated from the identifiers BSI and VPI in the separator 10 is inputted to a cell register 11 activated by a write control signal WR outputted from the separator 10. The cell register 11 holds the data IF(h) until a next write control signal WR is inputted. On the other hand, the broadcast identifier BSI and the virtual path identifier VPI of the header separated from the data IF(h) in the separator 10 are inputted to a first header conversion memory 12 activated by the write control signal WR. The conversion memory 12 has stored predetermined data in addresses assigned by the identifiers BSI and VPI. That is, as shown in FIG. 5, the conversion memory 12 preliminarily stores a VPI to be newly given as data so that it operates as a mere VPI conversion table for the cell whose identifier BSI is in an off state (logical "1") and which is not required to be broadcast. Further, for a cell whose identifier BSI is in an on state (logical "0") and which is to be broadcast the memory 12 preliminarily stores address and data necessary to assign the node number (station number) NOD to be broadcast and to assign a second header conversion memory 14 to be described later. A counter 13 has an input from the memory 12 provided with the node number NOD to be broadcast when the identifier BSI is in the on state, outputs an output enable signal OTEB having a pulse width corresponding to the node number to the separator 10 and outputs a count value CNT to the conversion memory 14.

The conversion memory 14 has stored preliminarily in successive addresses thereof data of a new VPI corresponding to other nodes to be broadcast which is supplied from nodes of information source, as shown in FIG. 6. Since the output data of the memory 12 indicates an address of a top identifier VPI of a succession of identifiers VPI stored in the memory 14 when the identifier BSI is on, all of the new identifiers VPI to be broadcast can be obtained from the memory 14 by assigning addresses by inputting the output data and the count value CNT from the counter 13 to the memory 14. A first cell assembling circuit 15 assembles data IF(h) of information area associated with other header information of the cell to be broadcast which is supplied from the cell register 11 with the respective new VPIs to be broadcast which is supplied from the memory 14 and outputs a complete ATM cell. A second cell assembling circuit 16 assembles data IF(h) of cells not to be broadcast which is supplied from the cell register 11 with the respective new VPIs from the memory 14 and outputs a complete ATM cell.

Figure 7:
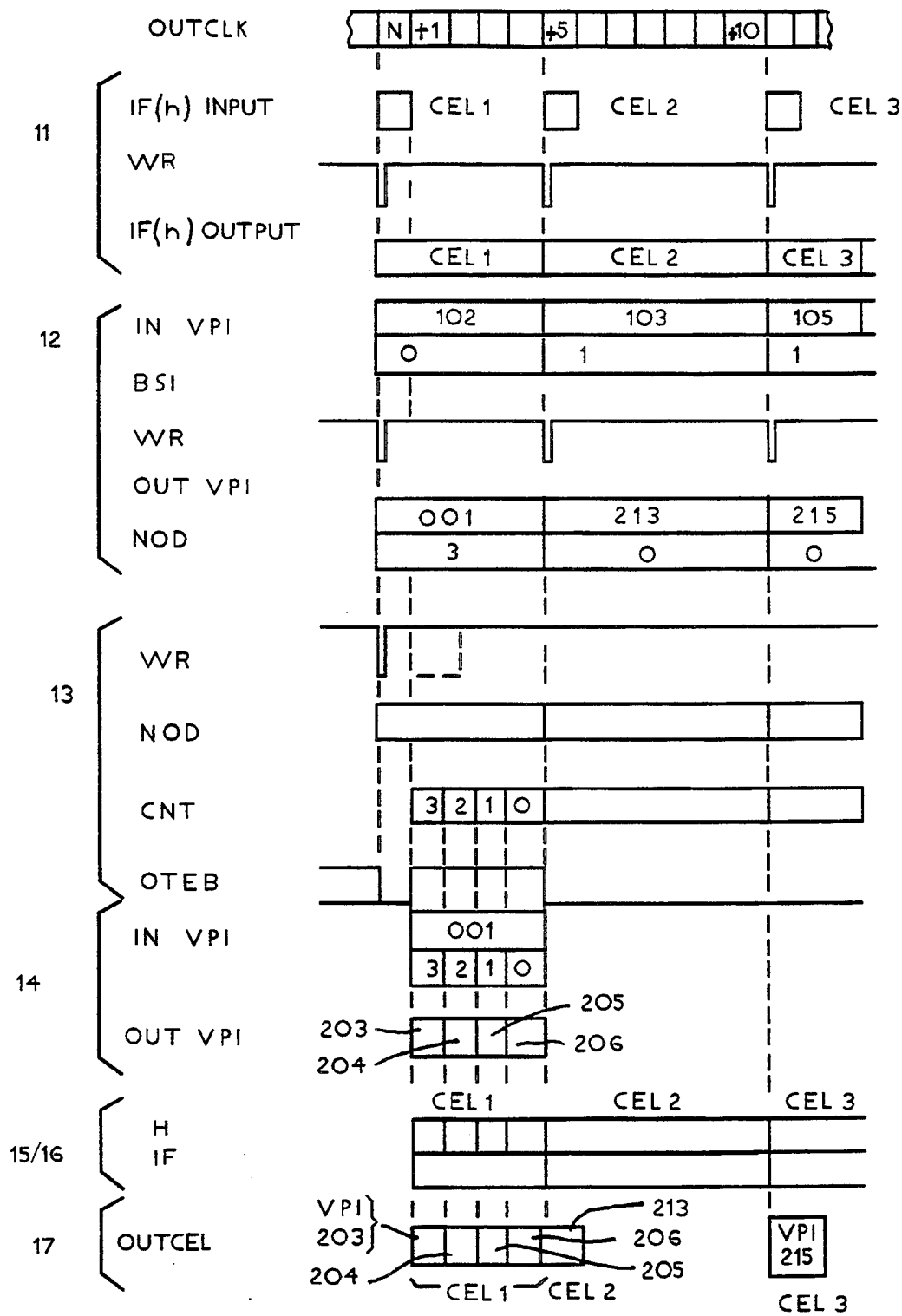
FIG. 7 shows input/output signals of the broadcast circuit shown in FIG. 2.

A cell multiplexer 17 samples the ATM cells from the cell assembling circuits 15 and 16 at the clock OUTCLK from the separator 10. Cells OUTCEL from the cell multiplexer 17 are supplied to a self-routing switch (not shown) provided in a subsequent stage and autonomously routed to paths of the transmission path indicated by the identifier VPI. A controller 18 stores preliminarily predetermined data such as shown in FIGS. 5 and 6 in the memories 12 and 14 according to an instruction from an operating system OPS at an initial setting of a communication network shown in FIG. 1 or when the setting is to be changed. That is, in a communication network composed of a plurality of nodes, nodes to be broadcast, transmission path and cell, etc., are determined by the operation system OPS and set in the memories 12 and 14 through the controller 18 of the related nodes. FIG. 7 shows and input/output signal relation of the circuits 11, ..., 17 when the aforementioned broadcast circuit 1 is supplied with ATM cell CEL1 to be broadcast to four nodes ATM cells CEL2 and CEL3 which are not to be broadcast sequentially.

Now, a collective selection of ATM cells CEL31, CEL41, CEL51 and CEL61 from the nodes ND3, ND4, ND5 and ND6 by means of the cell selection circuit 2 of the cross-connect system CE provided in the node ND2 and a transfer of only effective cells to the node ND1 will be described with reference to FIGS. 1, 8, 9 and 10. The separator 20 of the cell selection circuit 2 (FIG. 8), multiplexed cell CEL including the cells CEL31, ..., CEL61 from the nodes ND3, ..., ND6 are inputted sequentially as shown in FIG. 9. The cells CEL31, ..., CEL61 each comprise a header H 5 bytes long and information area IF 48 bytes long, the identifier VPI is included in the virtual identification area of the header H as an information indicative of a designation of cell (here, the node ND1). In the information areas IFs of the cells CEL31, ..., CEL61, status identifiers SIs indicative of effectiveness (logical "0") or ineffectiveness (logical "1") of the data of the information areas IF are assigned, respectively. The identifiers SI are given by respective nodes at cell issue time. The separation circuit 20 separates, for respective cells CELs (CEL31, ..., CEL61) inputted thereto, the virtual path identifier VPI contained in the header H from the data IF(h) of the information area associated with other header information. The separator 20 has basically the same construction as that of the separator circuit 10 of the broadcast circuit shown in FIG. 3 in detail. A status identifier separation circuit 21 separates, from the data IF(h) of the respective cells from the separator 20, the status identifier SI contained in their specific bit positions. The identifiers VPI and SI separated by the separation circuits 20 and 21, respectively, are provided as input to the header conversion memory 22 as address information. The conversion memory 22 stores preliminarily new identifier VPI corresponding to the inputted identifier VPI as data, as shown in FIG. 10. The off state of the inputted identifier SI (SI=1) indicates that the data of the information area IF is invalid, that is, it is not to be transferred to the node ND1 and a header of empty cell (all bits being "1") is stored in the data corresponding to the address input of SI=1 of the memory 22. Although, for the cells CEL31, ..., CEL61 designated from the nodes ND3, ..., ND6 to the node ND1, header H for the node ND1 is attached to the identifier VPI, the memory 22 outputs new identifier VPI designated to the empty cell header or the node ND1 according to the status of the inputted identifiers VPI and SI. An empty cell generation circuit 23 is transparent for the data IF(h) from the separation circuit 21 when the status of the identifier SI is on (SI=0) and gives "1" to the bit position of the identifier SI. The empty cell generation circuit 23 also converts the data IF(h) into an empty cell data EPT (all bits being "1") when the status of the identifier SI is off (SI=1). A cell assembling circuit 24 assemblies the cell CEL31 which gives a new identifier VPI from the memory 22 to the virtual path identification area of the data IF(h) supplied from the empty cell generation circuit 23 as an output cell OUTCEL. The cell assembling circuit 24 provides, for the cells CEL41, CEL51 and CEL61 among the input cells CELs, empty cells EPCELs as an output cell OUTCELs. The output cell OUTCEL from the cell assembling circuit 24 is inputted to a self-routing switch in a subsequent stage and only the cell CEL31 from the node ND3 is transferred to the node ND1.

A control circuit 25 preliminarily stores data shown in FIG. 10 in the memory 22 according to an instruction from the operation system OPS at a time such as the initial setting of the communication network. The above described cell selection in the cell selection circuit 2 is necessary at a response from nodes ND3, ..., ND6 to broadcast of cell made to node ND3, ..., ND6 and not only cell CEL31 but also cells CEL41, CEL51 and CEL61 can be selected as valid cell, respectively. Thus, by selecting and transferring only valid cells, the network resources such as transmission path can be effectively utilized.

Figure 11:
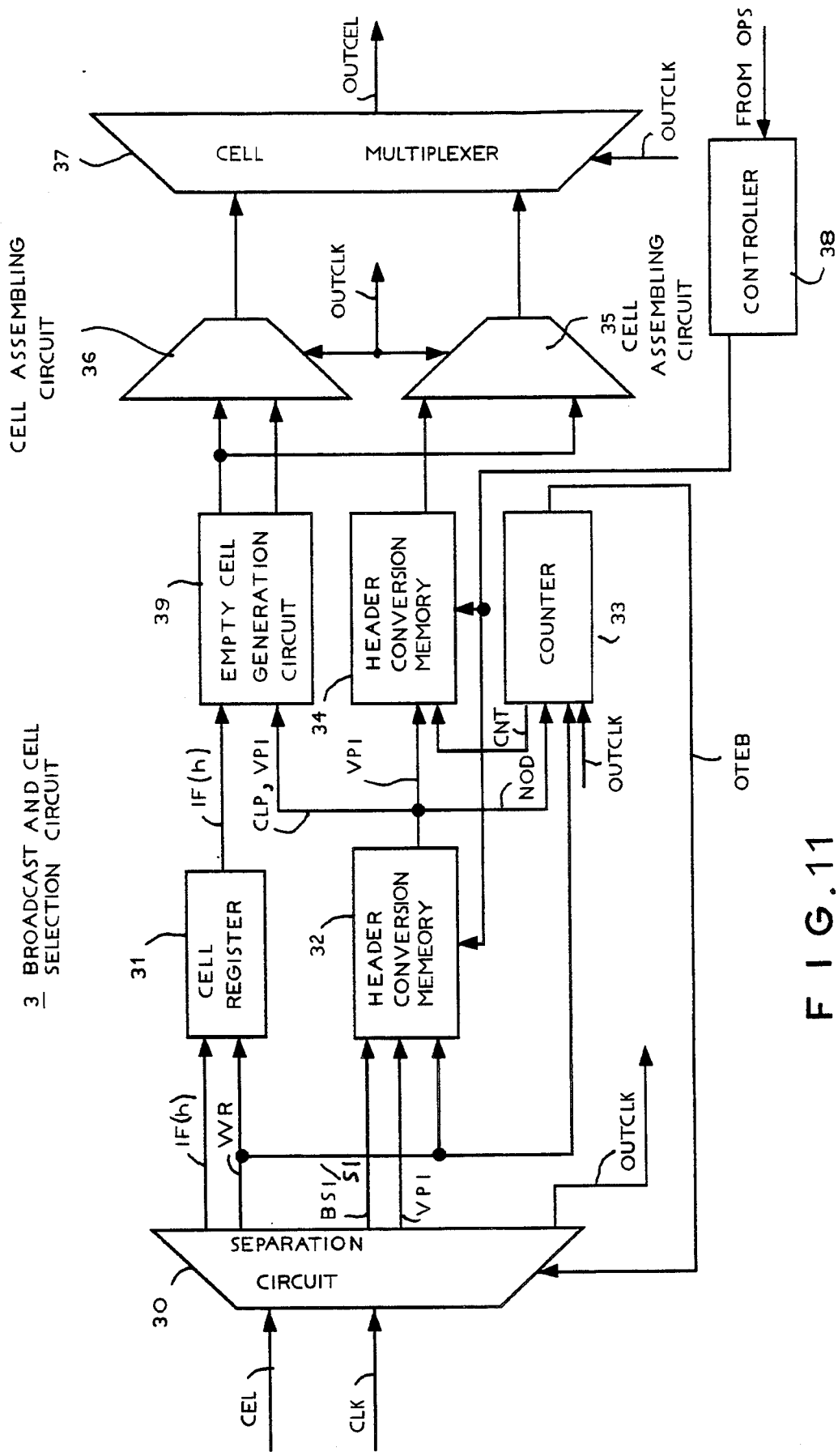
FIG. 11 shows construction of the broadcast and cell selector circuits in a second embodiment of the present invention.

A cross-connect system according to a second embodiment of the present invention includes a broadcast and cell selection circuit 3 shown in FIG. 11 which is disposed in a node ND2 of a high rate, wide band communication network shown in FIG. 1 as in the first embodiment. In the second embodiment, a shared usage of structural circuit components necessary for broadcast and cell selection is realized by assigning to a portion of the virtual path identification area of the header of a cell both the broadcast identifier BSI for identifying the ATM cell to be broadcast and status identifier SI for indicating validity or invalidity of data of the information area and by performing a cell transfer. In this circuit 3, a separation circuit 30, a cell register 31, a first header conversion memory 32, counter 33, a second header conversion memory 34, a first cell assembling circuit 35, a second cell assembling circuit 36, a cell multiplexer 37 and a control circuit 38 function to broadcast and perform substantially the same operation as that performed by the circuits 10, 11, 12, 13, 14, 15, 16, 17 and 18 of the broadcast circuit 1 of the first embodiment, basically. However, since the separation circuit 30, the cell register 31, the memory 32 and the cell assembling circuit 36 perform the cell selection function, mainly, a clamp bit CLP such as shown in FIG. 12 has to be added as data to be preliminarily stored in the memory 32 by the control circuit 38. The clamp bit CLP controls the empty cell generation circuit 39 at broadcast and cell section operation to enable the shared usage of the constructive circuit components. That is, when a clamp bit CLP of logical "1" which is preliminarily stored in an address assigned by broadcast identifier BSI and virtual path identifier VPI provided as an input to the memory 32 at the broadcast operation or the status identifier SI ("0": valid) and identifier VPI provided as an input to the memory 32 at the cell selection operation is provided as an input from the memory 32 to the empty cell generation circuit 39, the latter circuit becomes transparent for the data IF(h) and new virtual path identifier VPI. When clamp bit CLP of logical "0" is inputted from the memory 32 to the generation circuit 39 (in which, identifier SI of logical "1" indicates invalid) at the cell selection, the circuit 39 converts the data IF(h) and identifier VPI into all bits "1" and outputs it as empty cell data. Therefore, the generation circuit 39 is transparent during the broadcast operation and thus it serves the broadcast function as in the first embodiment. Further, during cell selection operation, only the cell whose status identifier SI indicates valid data of information area is transferred.

Other alternatives and modifications to the above-mentioned embodiments can be made within the scope of the invention defined by the appended claims.

What is claimed is:

1. A cross-connect system for an asynchronous transfer mode (ATM) communication network, wherein information is transmitted comprising ATM cells, the system comprising:
first means for separating from each other;
a first identifier contained in a multi-bit header of an ATM cell of a predetermined number of bits for identifying a broadcast destination of said ATM cell having said header and an information region;
a single-bit binary broadcast identifier contained in said header and having a first state and a second state indicative of need and lack of need for broadcasting, respectively; and
data in said information region and associated with header information other than said first identifier and said broadcast identifier;
second identifier for obtaining a number of communication nodes to be broadcast and a new destination to which a broadcast is to be made in a position dependent on said first identifier when said broadcast identifier is in said first state and preliminarily storing a new third identifier in said position dependent on said first identifier when said broadcast identifier is in said second state;
third means for providing a count value corresponding to the number of communication nodes stored in said second means;
fourth means for preliminarily and consecutively storing a fourth identifier corresponding to the broadcast destination to be made in a position dependent on said second identifier from said second means and said count value from said third means;
fifth means for assembling a cell to be broadcast from said data from information region and said fourth identifier from said fourth means;
sixth means for assembling a cell not to be broadcast from said data from said information region and said third identifier from said second means; and
seventh means for selectively providing the cell to be broadcast and the cell not to be broadcast from said fifth and sixth means as to a self-routing switch.

2. A cross-connect system for an asynchronous transfer mode (ATM) communication network, wherein information is transmitted comprising ATM cells, the system comprising:
first means for separating from each other:
a first identifier contained in a multi-bit header of an ATM cell of a predetermined number of bits for identifying a broadcast destination of said ATM cell having said header and an information region and data in said information region;
a single-bit binary broadcast identifier contained in said header and having a first state and a second state indicative of need and lack of need for broadcasting, respectively; and
data in said information region and associated with header information other than said first identifier and said broadcast identifier;
second means for separating a single-bit binary status identifier contained in said information region and indicative of validity and invalidity of the data of said information region from said data from said first means;
third means for preliminarily storing temporarily a second identifier in a position dependent on said first identifier when said status identifier indicates validity and preliminarily storing first data for assembling an empty cell in said position dependent on said first identifier when said status identifier indicates invalidity;
fourth means for providing said data in said information region other than said status identifier stored therein from said second means when said status identifier indicates validity and providing second data for assembling the empty cell when said status identifier indicates invalidity; and
fifth means for providing a valid cell assembled with said second identifier from said third means and said data in said information region from said fourth means and the empty cell assembled with said first data from said third means and said second data from said fourth means to a self-routing switch.

3. A cross-connect system for an asynchronous transfer mode (ATM) communication network, wherein information is transmitted comprising ATM cells, the system comprising:
first means for separating from each other;
a first identifier contained in a multi-bit header of an ATM cell of a predetermined number of bits for identifying a broadcast destination of said ATM cell having said header and an information region;
a single-bit binary broadcast identifier contained in said header and having a first state and a second state indicative of need and lack of need for broadcasting, respectively; and
first data in said information region and associated with header information other than said first identifier and said broadcast identifier;
second means for preliminarily storing temporarily a second identifier for obtaining a number of communication nodes to be broadcast and a new destination to which broadcast is to be made in a position dependent on said first identifier when said broadcast identifier is in said first state and preliminarily storing a new third identifier in said position dependent on said first identifier when said broadcast identifier is in said second state;

third means for providing a count value corresponding to the number of communication nodes stored in said second means;

fourth means for preliminarily and consecutively storing a fourth identifier corresponding to the broadcast destination to be made in a position dependent on said second identifier from said second means and said count value from said third means;

fifth means for assembling a cell to be broadcast from said first data from said information region and said fourth identifier from said fourth means;

sixth means for assembling a cell not to be broadcast from said first data from said information region and said third identifier from said second means;

seventh means for selectively providing the cell to be broadcast and the cell not to be broadcast from said fifth and sixth means to a self-routing switch;

eighth means for separating a fifth identifier contained in said header of said ATM cell and indicative of the destination of said ATM cell and second data contained in said information region and associated with the header information other than said fifth identifier, from each other;

ninth means for separating a single bit status identifier contained in said information region and indicative of validity and invalidity of said information region form said second data in said information region from said eighth means;

tenth means for preliminarily storing temporarily a sixth identifier in a position dependent on said fifth identifier when said status identifier indicates validity and preliminarily storing said first data for assembling an empty cell in said position dependent on said first identifier when said status identifier indicates invalidity;

eleventh means for providing said first data in said information region other than said status identifier stored therein from said ninth means when said status identifier indicates validity and providing said second data for assembling the empty cell when said status identifier indicates invalidity; and twelfth means for providing the valid cell assembled with sixth identifier from said tenth means and said second data in said information region from said eleventh means and the empty cell assembled with said first data from said tenth means and said second data from said eleventh means to a self-routing switch.

4. A cross-connect system for an asynchronous transfer mode (ATM) communication network, wherein information is transmitted comprising ATM cell, the system comprising:

first means for separating from each other;

a first identifier contained in a multi-bit header of an ATM cell of a predetermined number of bits for identifying a broadcast destination of said ATM cell having said header and an information region;

a single-bit binary broadcast identifier contained in said header and having a first state and a second sate indicative of need and lack of need for broadcasting, respectively; and first data in said information region and associated with header information other than said first identifier and said broadcast identifier;

second means for preliminarily storing temporarily a second identifier for obtaining a number of communication nodes to be broadcast and a new destination to which broadcast is to be made in a position dependent on said first identifier when said broadcast identifier is in said first state and preliminarily storing a third identifier and first control data in said position dependent on said first identifier when said broadcast identifier is in said second state;

third means for providing a count value corresponding to the number of communication nodes stored in said second means;

fourth means for preliminarily and consecutively storing a fourth identifier corresponding to the broadcast destination to be made in a position dependent on said second identifier from said second means and said count value from said third means;

fifth means for passing said first data of said information region and said third identifier from said first control data is provided together with said third identifier from said second means;

sixth means for assembling a cell to be broadcast from said first data from said information region and said fourth identifier from said fourth means;

seventh means for assembling a cell not to be broadcast from said first data from said information region and said third identifier from said fifth means; and eighth means for selectively providing the cell to be broadcast and the cell not to be broadcast from said sixth and seventh means to a self-routing switch;

said first means being capable of spearing a binary status identifier indicative of validity and invalidity of said information region in lieu of said broadcast identifier;

said second means preliminarily storing said second identifier and said first control data in a position dependent on said first identifier when said status identifier indicates validity and preliminarily storing said second identifier and second control data in said position dependent on said first identifier when said status identifier indicates invalidity;

said fifth means passing said first data of said information region and said second identifier when said first control data is provided together with said second identifier from said second means and converting said first data in said information region and said second identifier into data for assembling the empty cell when said second data is provided together with said second identifier from said second means;

said seventh means assembling a valid cell with said first data from said information region and second identifier from said fifth means and assembling the empty cell with said data for assembling the empty cell from said fifth means;

said eighth means providing said valid and empty cells to said self-routing switch.

5. A method for asynchronous transfer mode (ATM) communication, wherein information is transmitted comprising ATM cells, the method comprising:

separating from each other;

a first identifier contained in a multi-bit header of an ATM cell of a predetermined number of bits for identifying a broadcast destination of said ATM cell having said header and an information region;

a single-bit binary broadcast identifier contained in said header and having a first state and a second state indicative of need and lack of need for broadcasting, respectively; and data in said information region and associated with header information other than said first identifier and said broadcast identifier;

preliminarily storing temporarily a second identifier for obtaining a number of communication odes to be broadcast and a new destination to which a broadcast is to be made in a position dependent on said first identifier when said broadcast identifier is in said first state and preliminarily storing a new third identifier in said position dependent on said first identifier when said broadcast identifier is in said second state;

providing a count value corresponding to the number of communication nodes stored;

preliminarily and consecutively storing a fourth identifier corresponding to the broadcast destination to be made in a position dependent on said second identifier and said count value;

assembling a cell to be broadcast from said data from said information region and said fourth identifier;

assembling a cell not to be broadcast from said data from said information region and said third identifier; and selectively providing the cell to be broadcast and the cell not to be broadcast to a self-routing switch.

6. A method for asynchronous transfer mode (ATM) communication, wherein information is transmitted comprising ATM cells, the method comprising:

separating from each other:

a first identifier contained in a multi-bit header of an ATM cell of a predetermined number of bits for identifying a broadcast destination of said ATM cell having said header and an information region and data in said information region;

a single-bit binary broadcast identifier contained in said header and having a first state and a second state indicative of need and lack of need for broadcasting, respectively; and data in said information region and associated with header information other than said first identifier and said broadcast identifier;

separating a single-bit binary status identifier in a position dependent on said first identifier when said status identifier indicates validity and preliminarily storing first data for assembling an empty cell in said position dependent on said first identifier when said status identifier indicates invalidity;

providing said data in said information region other than said status identifier stored therein when said status identifier indicates validity and providing second data for assembling the empty cell when said status identifier indicates invalidity; and providing a valid cell assembled with said second identifier and said data in said information region and the empty cell assembled with said first data and said second data to a self-routing switch.

7. A method for asynchronous transfer mode (ATM) communication, wherein information is transmitted comprising ATM cells, the method comprising:

separating from each other:

a first identifier contained in a multi-bit header of an ATM cell of a predetermined number of bits for identifying a broadcast destination of said ATM cell having said header and an information region;

a single-bit binary broadcast identifier contained in said header and having a first state and a second state state indicative of need and lack of need for broadcasting, respectively; and first data in said information region and associated with header information other than said first identifier and said broadcast identifier;

preliminarily storing temporarily a second identifier for obtaining a number of communication nodes to be broadcast and a new destination to which broadcast is to be made in a position dependent on said first identifier when said broadcast identifier is in said first state and preliminarily storing a new third identifier in said position dependent on said first identifier when said broadcast identifier is in said second state;

providing a count value corresponding to the number of communication nodes stored;

preliminarily and consecutively storing a fourth identifier corresponding to the broadcast destination to be made in a position dependent on said second identifier and said count value;

assembling a cell to be broadcast from said first data from said information region and said fourth identifier;

assembling a cell not to be broadcast from said first data from said information region and said third identifier;

selectively providing the cell to be broadcast and the cell not to be broadcast to a self-routing switch;

separating a fifth identifier contained in said header of said ATM cell and indicative of the destination of said ATM cell and second data contained in said information region and associated with the header information other than said fifth identifier, form each other;

separating a single bit status identifier contained in said information region and indicative of validity and invalidity of said information region from said second data in said information region;

preliminarily storing temporarily a sixth identifier in a position dependent on said fifth identifier when said status identifier indicates validity and preliminarily storing first data for assembling an empty cell ion said position dependent on said first identifier when said status identifier indicates invalidity;

providing said first data in said information region other than said status identifier stored therein when said status identifier indicates validity and providing said second data for assembling the empty cell when said status identifier indicates invalidity; and providing the valid cell assembled with said sixth identifier and said second data in said information region and the empty cell assembled with said first data and said second data to a self-routing switch.

8. A method for asynchronous transfer mode (ATM) communication, wherein information is transmitted comprising ATM cells, the method comprising:

a first identifier contained in a multi-bit header of an ATM cell of a predetermined number of bits for identifying a broadcast destination of said ATM cell having said header and an information region;

a single-bit binary broadcast identifier contained in said header and having a first state and a second state indicative of need and lack of need for broadcasting, respectively; and first data in said information region and associated with header information other than said first identifier and said broadcast identifier;

preliminarily storing temporarily a second identifier for obtaining an umber of communication nodes to be broadcast and a new destination to which broadcast is to be made in a position dependent on said first identifier when said broadcast identifier is in said first state and preliminarily storing a third identifier and a first control data in said position dependent on said first identifier when said broadcast identifier is in said second state;

providing a count value corresponding to the number of communication nodes stored;

preliminarily and consecutively storing a fourth identifier corresponding to the broadcast destination to be performed in a position dependent on said second identifier and said count value;

passing said first data of said information region and said third identifier when said first control data is provided together with said third identifier;

assembling a cell to be broadcast from said first data from said information region and said fourth identifier;

assembling a cell not to be broadcast from said first data from said information region and said third identifier; and selectively providing the cell to be broadcast and the cell not to be broadcast to a self-routing switch;

said step of separating comprising separating a binary status identifier indicative of validity and invalidity of said information region in lieu of said broadcast identifier;

said first step of preliminarily storing comprising preliminarily storing said second identifier and said first control data in a position dependent on said first identifier when said status identifier indicates validity and preliminarily storing said second identifier and second control data in said position dependent on said first identifier when said status identifier indicates invalidity;

said step of passing further comprising passing said first data of said information region and said second identifier when said first control data is provided together with said second identifier and converting said first data in said information region and said second identifier into data for assembling the empty cell when said second data is provided together with said second identifier;

said steps of assembling a cell to be broadcast comprising assembling a valid cell with said first data from said information region and the second identifier and said step of assembling a cell not to be broadcast comprising assembling the empty cell with said data for assembling the empty cell; and said step of selectively providing the cell to be broadcast and the cell not to be broadcast comprising providing said valid and empty cells to said self-routing switch.

9. A cross-connect system for an asynchronous transfer mode (ATM) communication network, wherein information is transmitted comprising ATM cells, the system comprising:

first means for separating from an ATM cell having a header and an information region:

a first identifier contained in said header to identify a destination of said ATM cell, a broadcast identifier contained in said header and having a first state and a second state indicative of need and lack of need for broadcasting, respectively, and data in said information region and associated with header information other than said first identifier and said broadcast identifier;

second means for preliminarily storing in a first position indicated by said first identifier a number of communication nodes to be broadcast and a second identifier related to destinations of the communication nodes to be broadcast when said broadcast identifier is in said first state and preliminarily storing a third identifier in said first position when said broadcast identifier is in said second state;

third means for outputting a count value corresponding to the number of communication nodes to be broadcast stored in said second means;

fourth means for preliminarily storing a fourth identifier corresponding to the destinations of the communication nodes to be broadcast in a second position indicated by said second identifier from said second means and said count value from said third means;

fifth means for assembling a cell to be broadcast from said data from said information region and said fourth identifier from said fourth means;

sixth means for assembling a cell not to be broadcast from said data from said information region and said third identifier from said second means; and seventh means for selectively outputting the cell to be broadcast and the cell not to be broadcast from said fifth and sixth means to a self-routing switch.

10. A cross-connect system for an asynchronous transfer mode communication network, wherein information is transmitted comprising ATM cells, the system comprising:

first means for separating, from an ATM cell having a header and an information region, a first identifier contained in said header to identify a destination of said ATM cell and data in said information region and associated with header ifmration other than said first identifier;

second means for separating a status identifier contained in said information region and indicative of validity of said information region from said data from said first means;

third means for preliminarily storing temporarily a second identifier in a position indicated by said first identifier when said status identifier indicates validity and preliminarily storing first data for assembling an empty cell in said position indicated by said first identifier when said status identifier indicates invalidity;

fourth means for outputting said data in said information region other than said status identifier stored therein from said second means when said status identifier indicates validity and outputting second data for assembling the empty cell when said status identifier indicates invalidity; and fifth means for outputting a valid cell assembled with said second identifier from said third means and said data in said information region from said fourth means and the empty cell assembled with said first data from said third means and said second data from said fourth means to a self-routing switch.

* * * * *